(12) United States Patent
del Pino et al.

(10) Patent No.: US 11,496,309 B2
(45) Date of Patent: Nov. 8, 2022

(54) METHOD FOR PERFORMING A DISJUNCTIVE PROOF FOR TWO RELATIONS

(71) Applicant: INTERNATIONAL BUSINESS MACHINES CORPORATION, Armonk, NY (US)

(72) Inventors: Rafael del Pino, Rueschlikon (CH); Vadim Lyubashevsky, Zug (CH); Gregory Neven, Oberrieden (CH); Gregor Seiler, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 987 days.

(21) Appl. No.: 16/020,741

(22) Filed: Jun. 27, 2018

(65) Prior Publication Data

US 2020/0005173 A1    Jan. 2, 2020

(51) Int. Cl.
*H04L 29/06* (2006.01)
*H04L 9/32* (2006.01)
*H04L 9/30* (2006.01)

(52) U.S. Cl.
CPC .............. *H04L 9/3218* (2013.01); *H04L 9/30* (2013.01)

(58) Field of Classification Search
CPC ........... H04L 9/30; G06N 5/006; G06F 21/00; H04W 12/00
See application file for complete search history.

(56) References Cited

U.S. PATENT DOCUMENTS 8,731,199 B2   5/2014  Jawurek
8,799,656 B2   8/2014  Brickell
(Continued)

FOREIGN PATENT DOCUMENTS

WO       2006103608       10/2006

OTHER PUBLICATIONS

Ryan Henry et al., "Batch Proofs of Partial Knowledge", ACNS 2013, Applied Cryptography and Network Security, pp. 502-517.
(Continued)

*Primary Examiner* — Edward Zee
*Assistant Examiner* — Leynna Truvan
(74) *Attorney, Agent, or Firm* — Scully, Scott, Murphy & Presser, P.C.; Daniel P. Morris (57) ABSTRACT

The present disclosure relates to a method method for performing a disjunctive proof for two relations $R_0$ and $R_1$. The relation $R_0$ is between an instance set $X_0$ and a witness set $W_0$ and defines a language $L(R_0)$ containing those elements $x_0 \in X_0$ for which there exists a witness $w_0$ that is related to $x_0$ in accordance with $R_0$. The relation $R_1$ is between an instance set $X_1$ and a witness set $W_1$ and defining a language $L(R_1)$ containing those elements $x_1 \in X_1$ for which there exists a witness $w_1$ that is related to $x_1$ in accordance with $R_1$. For proving knowledge of a witness $w_b$ of at least one of instances $x_0$ and $x_1$, where b is 0 or 1, of the respective relations $R_0$ and $R_1$, the prover may generate using a bijective function a challenge from a simulated challenge $c_{1-b}$.

14 Claims, 7 Drawing Sheets

(56) References Cited

U.S. PATENT DOCUMENTS

2012/0144459 A1\* 6/2012 Nguyen ............... H04L 9/0891
 726/5
2016/0021096 A1 1/2016 Wallrabenstein
2017/0149796 A1\* 5/2017 Gvili ................... H04L 9/0625
2017/0163421 A1 6/2017 Chase
2018/0309574 A1\* 10/2018 Lyubashevsky ...... H04L 9/3093

OTHER PUBLICATIONS

Cramer, R., et al., "Proofs of Partial Knowledge and Simplified Design of Witness Hiding Protocols", Advances in Cryptology—CRYPTO '94, 1994, pp. 174-187, LNCS 839.

\* cited by examiner

METHOD FOR PERFORMING A DISJUNCTIVE PROOF FOR TWO RELATIONS

BACKGROUND

The present invention relates to the field of digital computer systems, and more specifically, to a method for performing a disjunctive proof for two relations.

Zero-knowledge proofs (ZKP) are cryptographic protocols that enable a prover to convince a verifier of the truth of a statement, without revealing anything more to the verifier than the mere truth of the statement. A zero-knowledge proof of knowledge (ZKPoK) enables the prover to prove that he knows some secret information, without leaking anything about that information. ZKPoKs are among the most widely used tools in cryptographic protocol design, with applications to basic primitives such as identification, digital signatures, and public-key encryption, as well as to more advanced constructions such as group signatures, anonymous credentials, electronic voting, and digital cash. However, there is a continuous need in improving existing and developing new protocols for proofs of knowledge.

SUMMARY

Various embodiments provide a method for performing a disjunctive proof for two relations, proving unit and computer program product as described by the subject matter of the independent claims. Advantageous embodiments are described in the dependent claims. Embodiments of the present invention can be freely combined with each other if they are not mutually exclusive.

In one aspect, the invention relates to a method for performing a disjunctive proof for two relations $R_0$ and $R_1$, the relation $R_0$ being between an instance set $X_0$ and a witness set $W_0$ and defining a language $L(R_0)$ containing those elements $x_0 \in X_0$ for which there exists a witness $w_0$ that is related to $x_0$ in accordance with $R_0$, the relation $R_1$ being between an instance set $X_1$ and a witness set $W_1$ and defining a language $L(R_1)$ containing those elements $x_1 \in X_1$ for which there exists a witness $w_1$ that is related to $x_1$ in accordance with $R_1$, wherein for proving knowledge of a witness $w_b$ of at least one of instances $x_b$ and $x_{1-b}$, where b is 0 or 1, of the respective relations $R_b$ and $R_{1-b}$ the method comprises:

providing a proving unit comprising a prover and a simulator, wherein the proving unit has an indication of the witness $w_b$ of $x_b$;

generating by the simulator, using the instance $x_{1-b}$, a transcript of a proof of knowledge of an eventual witness of $x_{1-b}$ comprising a simulated commitment, a simulated challenge $c_{1-b}$ from a challenge set $C_{1-b}$, and a simulated response;

generating by the prover a real commitment as a first step in a real proof of knowledge of a witness $w_b$ to $x_b$;

sending by the prover the real and simulated commitments to a verifier;

in response to the sending of the commitments, receiving by the prover from the verifier a bijective function $\pi$ mapping elements from challenge set $C_0$ to challenge set $C_1$;

computing by the prover a real challenge $c_b$ so that $c_b = \pi^{2b-1}(c_{1-b})$ (e.g. so that $c_1 = \pi(c_0)$);

creating by the prover a real proof of knowledge using as input a witness $w_b$ of $x_b$ comprising the real commitment, the real challenge $c_b$, and a real response;

sending by the prover the real and simulated proofs of knowledge to the verifier causing the verifier to accept the proofs.

In another aspect, the invention relates to a method for performing a disjunctive proof for two relations $R_0$ and $R_1$, the relation $R_0$ being between an instance set $X_0$ and a witness set $W_0$ and defining a language $L(R_0)$ containing those elements $x_0 \in X_0$ for which there exists a witness $w_0$ that is related to $x_0$ in accordance with $R_0$, the relation $R_1$ being between an instance set $X_1$ and a witness set $W_1$ and defining a language $L(R_1)$ containing those elements $x_1 \in X_1$ for which there exists a witness $w_1$ that is related to $x_1$ in accordance with $R_1$, wherein for proving knowledge of a witness $w_b$ of at least one of instances $x_0$ and $x_1$, where b is 0 or 1, of the respective relations $R_0$ and $R_1$, the method comprises:

providing a proving unit comprising a prover and a simulator, wherein the proving unit has an indication of the witness $w_b$ of $x_b$;

generating by the simulator, using the instance $x_{1-b}$, a transcript of a proof of knowledge of an eventual witness of $x_{1-b}$ comprising a simulated commitment, a simulated challenge $c_{1-b}$ from a challenge set $C_{1-b}$, and a simulated response;

generating by the prover a real commitment as the first step in a real proof of knowledge of a witness $w_b$ to $x_b$;

generating by the prover a hash value by applying a hash function to an input comprising the true commitment and the real commitment, and interpreting said hash value as the description a bijective function $\pi$ mapping elements from challenge set $C_0$ to challenge set $C_1$;

computing by the prover a real challenge $c_b$ so that $c_b = \pi^{2b-1}(c_{1-b})$;

creating by the prover a real proof of knowledge using as input a witness $w_b$ of $x_b$ comprising the real commitment, the real challenge $c_b$, and a real response; and sending by the prover the real and simulated proofs of knowledge to the verifier causing the verifier to accept the proofs.

In another aspect, the invention relates to a computer program product comprising a computer-readable storage medium having computer-readable program code embodied therewith, the computer-readable program code configured to implement steps of the method according to preceding embodiments.

In another aspect, the invention relates to a proving unit for performing a disjunctive proof for two relations $R_0$ and $R_1$, the relation $R_0$ being between an instance set $X_0$ and a witness set $W_0$ and defining a language $L(R_0)$ containing those elements $x_0 \in X_0$ for which there exists a witness $w_0$ that is related to $x_0$ in accordance with $R_0$, the relation $R_1$ being between an instance set $X_1$ and a witness set $W_1$ and defining a language $L(R_1)$ containing those elements $x_1 \in X_1$ for which there exists a witness $w_1$ that is related to $x_1$ in accordance with $R_1$, wherein for proving knowledge of a witness of at least one of instances $x_b$ and $x_{1-b}$, b is 0 or 1, of the respective relations $R_b$ and $R_{1-b}$, the proving unit comprising a prover and a simulator, the proving unit having an indication of the witness of $x_b$; wherein the simulator is configured for generating using the instance $x_{1-b}$, a transcript of a proof of knowledge of an eventual witness of $x_{1-b}$ comprising a simulated commitment, a simulated challenge from challenge set $C_{1-b}$, and a simulated response; wherein the prover is configured for:

generating a real commitment in a proof of knowledge of a witness $w_b$ for the instance $x_b$;

sending the real and simulated commitments to a verifier;
in response to the sending of the commitments, receiving from the verifier a bijective function π mapping elements from challenge set $C_0$ to challenge set $C_1$;
generating a real challenge $c_b$ from challenge set $C_b$ by such that $c_b = \pi^{2b-1}(c_{1-b})$;
creating a real proof of knowledge of the witness of $x_b$ using as inputs the instance $x_b$ and the corresponding witness $w_b$, comprising of the real commitment, the real challenge $c_b$ and a real response; and
sending the real and simulated proofs of knowledge causing the verifier to accept the proofs.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present method provides a construction of OR-proofs for protocols based on random permutations over the challenge space, rather than on secret sharing schemes. The present method may particularly be advantageous for challenges which are random elements from a set that does not form a group (e.g., vectors with small norm in a ring), and for which it is therefore not clear how one could use them as shares in a perfect secret-sharing scheme. For example, the present method may be used to further secure lattice-based cryptography.

The present method may for example be used in lattice-based electronic voting schemes for binary elections (e.g., where each voter proves his ballot contains a zero or one vote), designated-verifier signatures, multi-party computation, and electronic cash.

According to one embodiment, the challenge sets $C_0$ and $C_1$ are identical, and where the bijective function π is a permutation over $C_0 = C_1$.

According to one embodiment, the challenge sets $C_0$ and $C_1$ are sets of integers, and where the bijective function π is a bijective function of the bit positions in a binary representation of elements of $C_0$.

According to one embodiment, the challenge sets $C_0$ and $C_1$ are sets of polynomials, and where the bijective function π is a permutation of the coefficients of the polynomials. This embodiment may particularly be advantageous for lattice based protocols.

According to one embodiment, the challenge sets $C_0$ and $C_1$ are a subset C of $\mathbb{Z}[X]/X^n+1$ for a predefined integer value n.

According to one embodiment, the proving of the knowledge of a witness of at least one of instances $x_b$ and $x_{1-b}$ is the proving of the following statement $x_0 \in L(R_0)$ OR $x_1 \in L(R_1)$.

According to one embodiment, the simulator is configured to generate for a given $x_k \in L(R_k)$, where k=0 or 1, a transcript that is indistinguishable from a transcript that is generated by the prover from the given $x_k$ and corresponding witness $w_k$.

According to one embodiment, the relation $R_b$ is defined such that a witness $w_b$ is a homomorphic commitment of corresponding instance $x_b$, wherein polynomials f of the challenge set are defined as follows $\{f \in \mathbb{Z}[X]/X^n+1 | \|f\|_\infty = 1, \|f\|_1 = 60\}$, wherein the predefined bijective function π is a permutation that is selected from permutation set $\Pi = \text{Perm}(n) \times \{0,1\}^{60}$, where n is an integer value. This may provide a secure two-party protocol for lattice-based cryptography.

According to one embodiment, the set $X_b$ is a cyclic group $\mathbb{G}$ of prime order q with generator g and the set $W_b$ is group $\mathbb{Z}$ q, wherein witness $w_b$ is related to corresponding instance $x_b$ as follows: $x_b = g^{w_b}$. This embodiment may enable an OR-proof construction to the Schnorr proof of discrete logarithms in accordance with the present method.

Figure 1:
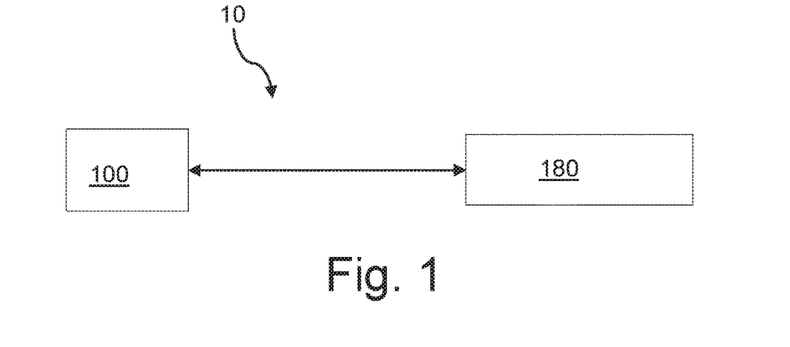
FIG. 1 illustrates an example of a proof system.

FIG. 1 illustrates an example of a proof system 10. As shown in FIG. 1, the proof system 10 includes a proving unit 100 and a verifier 180. The proving unit 100 and the verifier 180 are connected via a network, which may be a wired, a wireless network or a combination thereof. Each of proving unit and the verifier provides computing capabilities. For example, each of proving unit and the verifier provides the storage, networking, memory, and processing resources.

Figure 2:
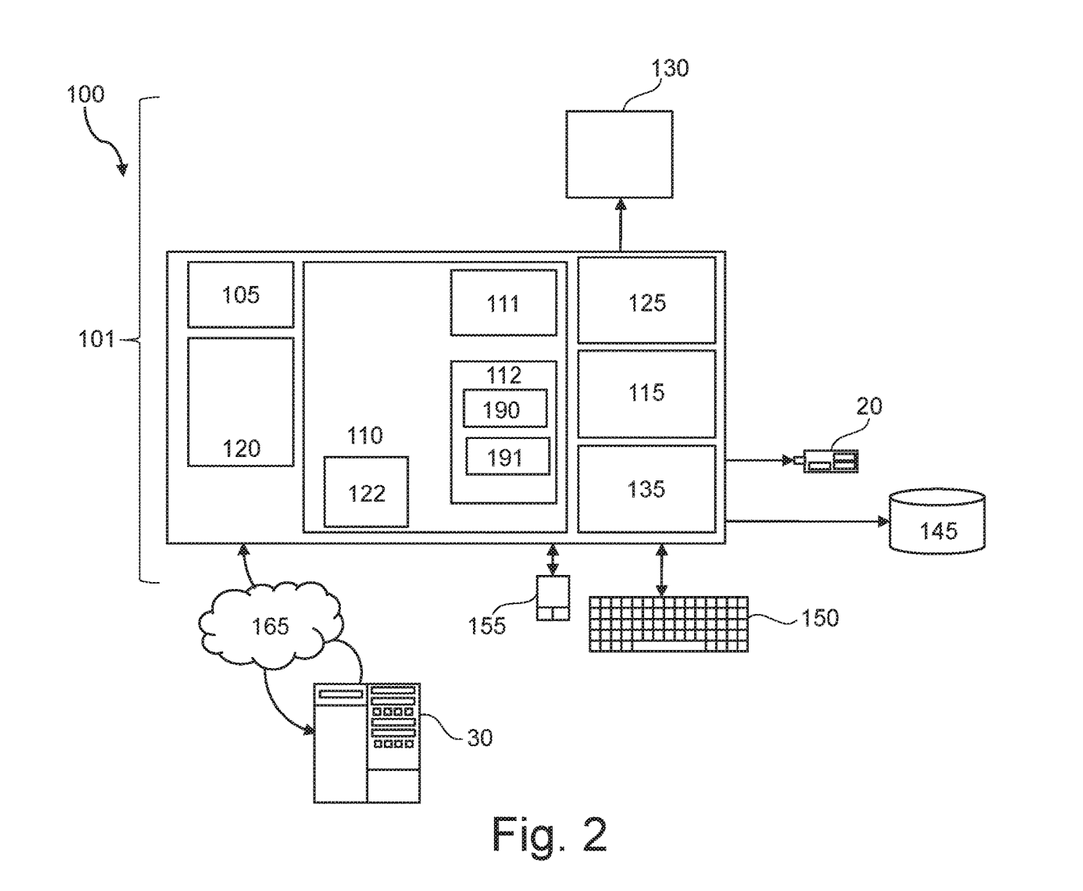
FIG. 2 represents a proving unit, suited for implementing one or more method steps as involved in the present disclosure.

FIG. 2 represents the proving unit 100 as a general computerized system, suited for implementing method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 2, the computer 101 includes a processor 105, memory (main memory) 110 coupled to a memory controller 115, and one or more input and/or output (I/O) devices (or peripherals) 20, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 20, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 2, software in the memory 110 includes instructions 112 e.g. instructions to manage databases such as a database management system.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 2, the methods can be stored on any computer readable medium, such as storage 120, for use by or in connection with any computer related system or method. The storage 120 may comprise a disk storage such as HDD storage.

The memory 110 may further comprise a prover 190 and a simulator 191. The simulator 191 and the prover 190 may be configured to generate a simulated transcript and real transcript respectively, wherein each transcript may be a tuple comprising at least a commitment, a challenge and a response. The elements of the simulated or real transcript may be generated or computed at different point of times. The simulated transcript is indistinguishable from transcripts of the prover. As long as an input is provided the generation of the transcripts from the input may be one of the known methods.

The proving unit 100 including the prover 190 (P) and the simulator 191 (Sim) and the verifier 180 (V) may be configured to perform a predefined two-party protocol S as follows. For example, S=(P,V) may be a two-party protocol, where V is probabilistic polynomial-time (PPT) algorithm, and $\Re$, $\Re'$ may be binary relations such that $\Re \subset \Re'$. S is called a $\Sigma'$-protocol for $\Re$, $\Re'$ with challenge set C, public input (or instance set) X and private input (or witness set) W, if and only if it satisfies the following conditions, referred to as "three-move form", "completeness", "Special soundness" and "Special honest-verifier zero-knowledge".

Three-move form:

the prover P computes a commitment t and sends it to verifier V. The verifier V then draws a challenge $c \xleftarrow{\$} C$ using the set of challenge C and sends it to prover P. The prover P sends a response s to the verifier V. Depending on the protocol transcript (t; c; s), the verifier V finally accepts or rejects the proof. The protocol transcript (t; c; s) is called accepting if the verifier accepts.

Completeness

Whenever $(x, w) \in \mathfrak{R}$, the verifier V accepts with probability at least $1-\alpha$.

Special Soundness

There exists a PPT algorithm E (a knowledge extractor) which takes as inputs two accepting transcripts (t, c', s'), (t, c", s") satisfying $c' \neq c"$, and outputs w' such that $(x, w') \in \mathfrak{R}'$.

Special Honest-Verifier Zero-Knowledge (SHVZK)

The simulator Sim is a PPT algorithm taking $x \in L(\mathfrak{R})$ and $c \in C$ as inputs, and outputs $\text{Sim}(x, c) = (t, s)$ so that the triple (t, c, s) is indistinguishable from an accepting protocol transcript generated by a real protocol run.

If S satisfies the above conditions, S may be called a $\Sigma'$-protocol for $\mathfrak{R} \subset \mathfrak{R}' \subset X \subset W$ with challenge set C.

The operation of the proof system 10 is further described with reference to following figures.

Figure 3:
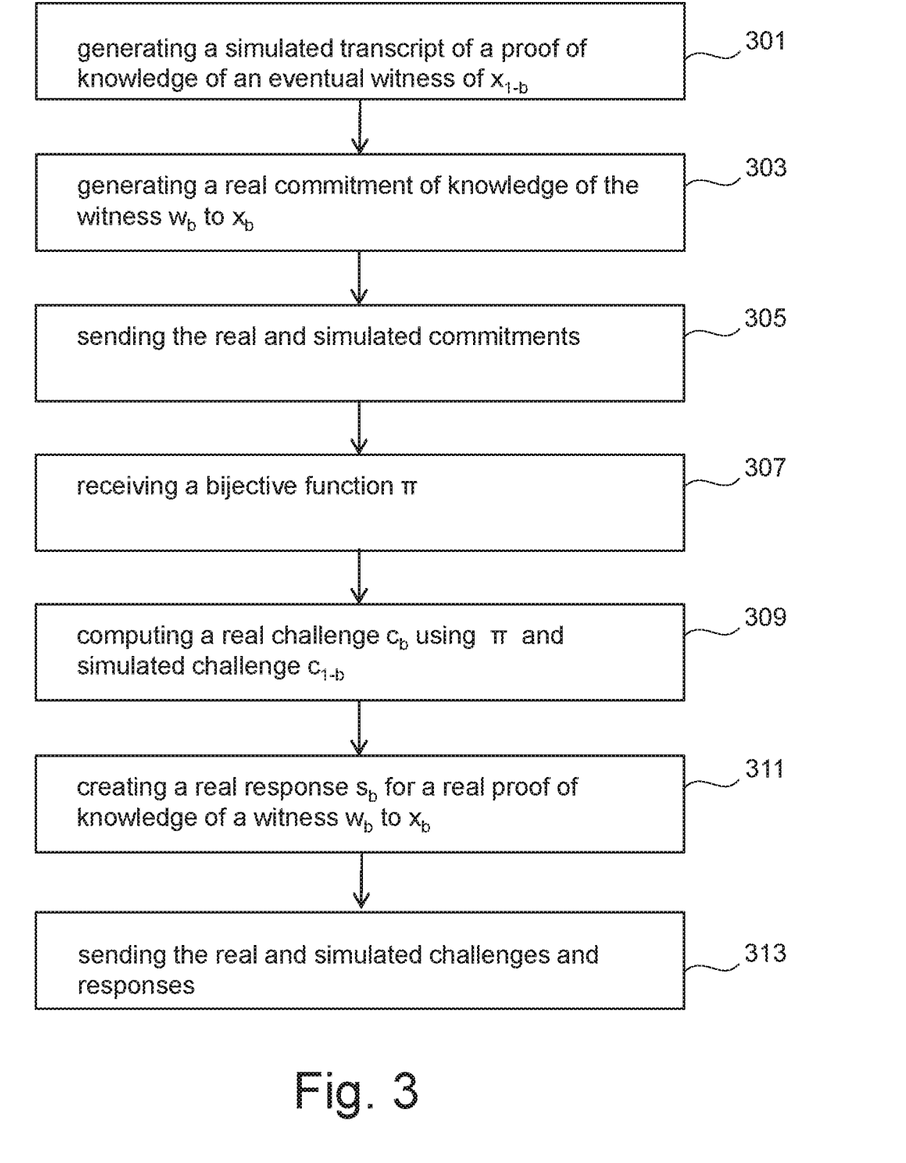
FIG. 3 is a flowchart of a method for performing a disjunctive proof for two relations.

FIG. 3 is a flowchart of a method for performing a disjunctive proof (or OR-proof) for two relations $R_0$ and $R_1$. The relation $R_0$ is a relation between an instance set $X_0$ and a witness set $W_0$. The relation $R_0$ defines a language $L(R_0)$ containing those elements $x_0 \in X_0$ for which there exists a witness w0 that is related to $x_0$ in accordance with the relation $R_0$. The relation $R_1$ is a relation between an instance set $X_1$ and a witness set $W_1$. The relation $R_1$ defines a language $L(R_1)$ containing those elements $x_1 \in X_1$ for which there exists a witness $w_1$ that is related to $x_1$ in accordance with the relation $R_1$. The method of FIG. 3 may enable an interactive zero-knowledge proof.

The method is for proving knowledge of a witness $w_b$ of at least one of instances $x_b$ and $x_{1-b}$, where b is 0 or 1, of the respective relations $R_b$ and $R_{1-b}$. For example, a user e.g. the proving unit 100 may know only one witness of the two witnesses bit and does not want to reveal which one he or she knows while still convincing the verifier that he or she knows the witness.

Assuming, for example, that the proving unit 100 has an indication of (or knows) the witness $w_b$ of $x_b$, but may not have an indication of the whiteness $w_{1-b}$ of $x_{1-b}$. The proving unit 100 may prove to the verifier 180 the knowledge of the witness $w_b$ as described with the method steps.

In step 301, the simulator 191 may generate using the instance $x_{1-b}$, a transcript of a proof of knowledge of an eventual witness of $x_{1-b}$. The generation of the transcript may be performed using in addition a simulated challenge $c_{1-b}$ from a challenge set $C_{1-b}$. The simulated challenge $c_{1-b}$ may be (e.g. randomly) selected from the challenge set $C_{1-b}$ by the simulator 191. The transcript comprises a simulated commitment, the simulated challenge $c_{1-b}$ from the challenge set $C_{1-b}$, and a simulated response. The simulator 191 may be configured to generate proofs that look like real ones.

In step 303, the prover 190 may generate a real commitment as a first step in a real proof of knowledge of the witness $w_b$ to $x_b$. The generation of the real commitment may be performed in parallel or after the generation of the transcript by the simulator 191. Performing the two generations in parallel may save processing time. Performing the generation of the real commitment after the generation of the transcript by the simulator 191 may enable to save processing resources that would otherwise be required by an unnecessary generation of the real commitment if the generation of the transcript is failed.

In step 305, the prover 190 may send to the verifier an indication of the real and simulated commitments to the verifier 180 e.g. via the network connection. For example the prover 190 may send to the verifier the real and simulated commitments. In another example, the prover 190 may send a hash value that is generated out of the real and simulated commitments using a predefined hash function. For example, before performing the sending, the prover 190 may receive an indication from the simulator 191 that the transcript is generated and where the transcript is stored or in another example, the prover may receive from the simulator the transcript.

In response to the sending of the commitments, the prover 190 may receive, in step 307, from the verifier 180 a bijective function $\pi$ mapping elements from challenge set $C_0$ to challenge set $C_1$. In one example, the proving unit 100 may comprise a set of functions and the verifier 180 may send an indication of the bijective function $\pi$ such that the prover can identify and select the bijective function $\pi$ from the set of functions.

The bijective function may depend on the type of the challenge sets $C_0$ and $C_1$. For example, in case the challenge sets $C_0$ and $C_1$ are identical, the bijective function $\pi$ may be a permutation over $C_0 = C_1$. In case the challenge sets $C_0$ and $C_1$ are sets of integers, the bijective function $\pi$ may be a bijective function of the bit positions in a binary representation of elements of $C_0$. In case the challenge sets $C_0$ and $C_1$ are sets of polynomials, the bijective function $\pi$ may be a permutation of the coefficients of the polynomials.

Using the received bijective function it, the prover 190 may compute in step 309 a real challenge $c_b$ from the simulated challenge $c_{1-b}$ so that $c_b = \pi^{2b-1}(c_{1-b})$, e.g. $c_1 = \pi(c_0)$ and $c_0 = \pi^{-1}(c_1)$.

In step 311, the prover 190 may create a real proof of knowledge using as input a witness $w_b$ of $x_b$. The real proof of knowledge comprises the real commitment, the real challenge $c_b$, and a real response.

In step 313, the prover 190 may send the real and simulated proofs of knowledge to the verifier 180 causing the verifier to accept the proofs.

Figure 4:
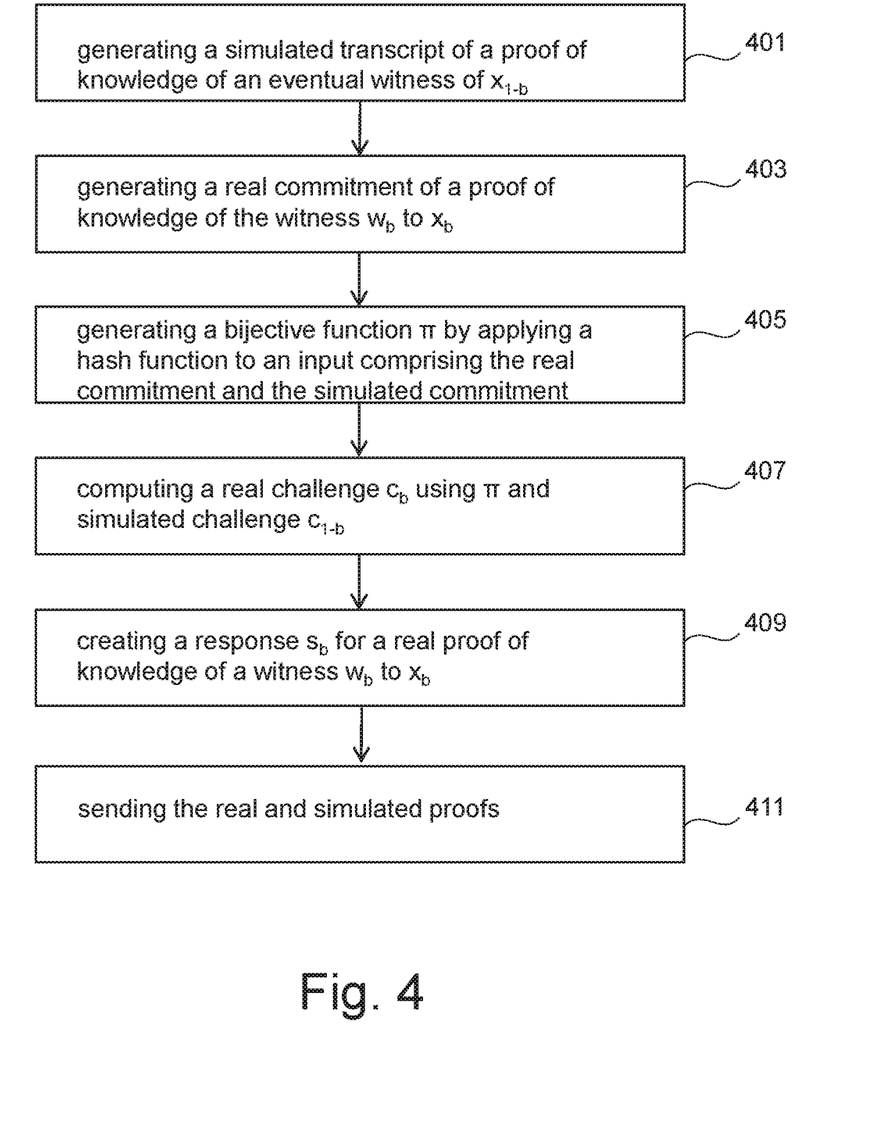
FIG. 4 is a flowchart of another method for performing a disjunctive proof for two relations.

FIG. 4 is a flowchart of another method for proving knowledge of a witness $w_b$ of at least one of instances $x_b$ and $x_{1-b}$, where b is 0 or 1, of the respective relations $R_b$ and $R_{1-b}$. The method of FIG. 4 may be a non-interactive zero-knowledge proof in that fewer communication steps between the prover and the verifier exist in comparison with the method of FIG. 3.

As with the method of FIG. 3, it may be assumed that the proving unit 100 has an indication of (or knows) the witness $w_b$ of $x_b$, but may not have an indication of the whiteness $w_{1-b}$ of $x_{1-b}$. The proving unit 100 may prove to the verifier 180 the knowledge of the witness $w_b$ as described with the method steps.

Step 401 is similar to step 301, in which the simulator 191 generates, using the instance $x_{1-b}$, a transcript of a proof of knowledge of an eventual witness of $x_{1-b}$ comprising a simulated commitment, a simulated challenge $c_{1-b}$ from the challenge set $C_{1-b}$, and a simulated response.

Step 403 is similar to step 303, in which the prover 190 generates a real commitment as a first step in a real proof of knowledge of the witness $w_b$ to $x_b$.

In step 405, the prover 190 may generate a hash value by applying a hash function to an input comprising the real commitment and the simulated commitment, wherein the hash value is a description or an indication of bijective function m mapping elements from challenge set $C_0$ to challenge set $C_1$.

Using the bijective function m, the prover 190 may compute in step 407 a real challenge $c_b$ so that $c_b = \pi^{2b-1}(c_{1-b})$; e.g. $c_1 = \pi(c_0)$ and $c_0 = \pi^{-1}(c_1)$.

In step 409, the prover 190 may create a real proof of knowledge using as input a witness $w_b$ of $x_b$. The real proof of knowledge comprises the real commitment, the real challenge $c_b$, and a real response.

In step 411, the prover 190 may send the real and simulated proofs of knowledge to the verifier 180 causing the verifier 180 to accept the proofs.

Figure 5:
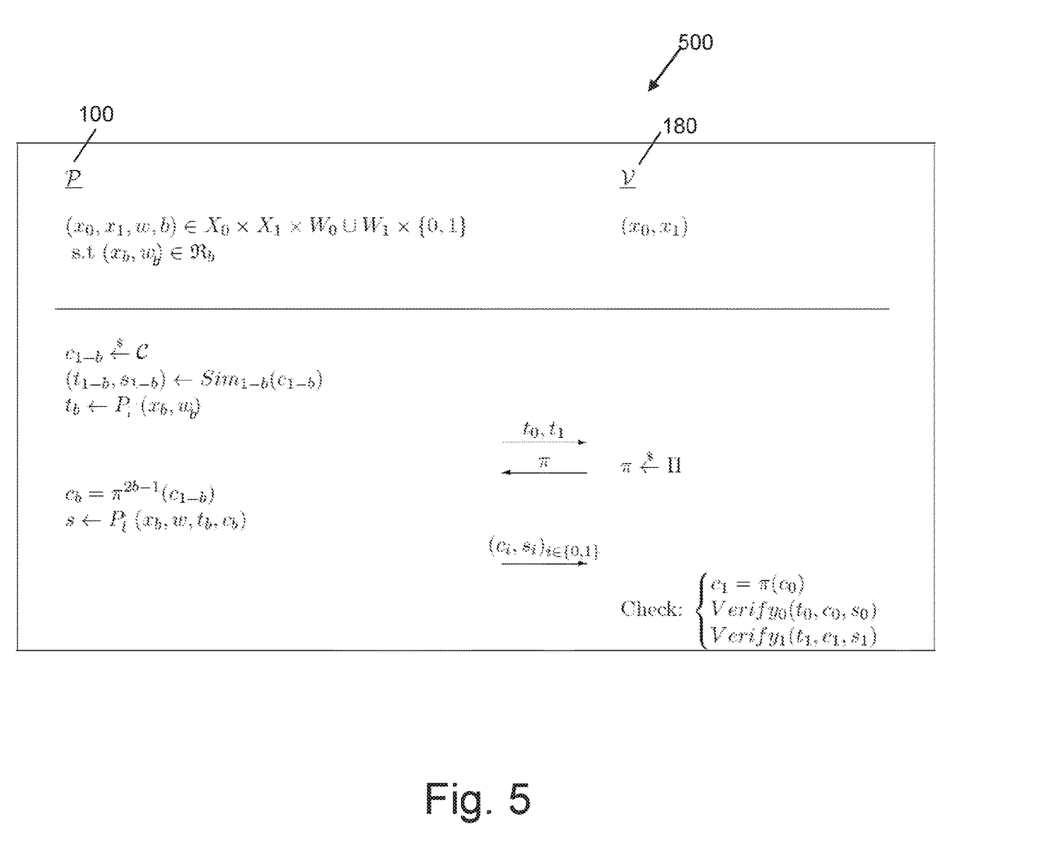
FIG. 5 is a diagram indicative of an example OR-proof protocol in accordance with the present disclosure.

FIG. 5 is a diagram 500 indicative of an example OR-proof method or protocol involving the proving unit 100 referred to as P and the verifier 180 referred to as V. The OR-proof of FIG. 5 may be a two-party protocol that involves multiple relations. The two-party protocol of FIG. 2 involves a single relation. And for simplification of the description, the protocol of FIG. 5 is described by reference to $\Sigma'$ protocol of FIG. 2.

Since two relations $\Re_0$ and $\Re_1$ are used for the protocol of FIG. 5, two $\Sigma'$ protocols $S_0$ and $S_1$ may be provided. $S_0$ is a $\Sigma'$ protocol for $\Re_0 \subset \Re'_0 \subset X_0 \subset W_0$ with challenge set C and $S_1$ is a $\Sigma'$ protocol for $\Re_1 \subset \Re'_1 \subset X_1 \subset W_1$ with challenge set C.

It is assumed that languages $L(\Re_0)$ and $L(\Re_1)$ satisfy the following $L(\Re_0) \sim X_0$ and $L(\Re_1) \sim X_1$ i.e. that no PPT algorithm can distinguish whether $x_0 \in L(\Re_0)$ or $x_0 \in X_0 \setminus L(\Re_0)$ and whether $x_1 \in L(\Re_1)$ or $x_1 \in X_1 \setminus L(\Re_1)$. This assumption is justified by the fact to prove a statement of the form $x_0 \in L(\Re_0) \lor x_1 \in L(\Re_1)$ without revealing which statement is true.

The simulator 191 may comprise two component simulators $Sim_0$ and $Sim_1$ for each of the $\Sigma'$ protocols $S_0$ and $S_1$ respectively. Simulator $Sim_0$ may be configured to receive as inputs elements of $X_0$ rather than elements of $L(\Re_0)$. Simulator $Sim_1$ may be configured to receive as inputs elements of $X_1$ rather than elements of $L(\Re_1)$. This is because $Sim_0$ ($Sim_1$) is a PPT algorithm and it cannot distinguish between the two sets and may thus still produce a valid transcript even if $x_0 \in X_0 \setminus L(\Re_0)$ ($x_1 \in X_1 \setminus L(\Re_1)$).

The challenge set C for each of the $\Sigma'$ protocols $S_0$ and $S_1$ may for example be a subset of $\mathbb{Z}[X]/X^n+1$ for a predefined value of n. However, the challenge set for the OR-proof protocol of FIG. 5 is $\Pi \subset Perm(C)$, where $\Pi$ has the following properties: Elements in $\Pi$ have a short representation, the uniform distribution over $\Pi$ can be computed efficiently, for any $\pi \in \Pi$, $\pi^{-1}$ can be computed efficiently, and for any $f, g \in C, Pr[\pi(f) = g] = 1/|C|$.

The OR-proof protocol of FIG. 5 provides a three-move form as follows. The simulator 191 using its components $Sim_0$ and $Sim_1$ generates for a given challenge $c_{1-b}$, where b=1 or 0, a pair of simulated commitment and simulated response $(t_{1-b}, s_{1-b})$. The prover 190 generates a real commitment for the knowledge of the witness $w_b$ to $x_b$. The generated commitments t0 and t1 by the simulator 191 and the prover 190 are sent by the prover to the verifier V. This forms the first move of the protocol.

In response to sending the commitments, the prover may receive from the verifier a permutation $\pi$ of the challenge set $\Pi$. This forms the second move of the protocol.

Using the received permutation, the prover may compute a real challenge $c_b$ so that $c_b = \pi^{2b-1}(c_{1-b})$ and generate a real response $s \leftarrow P(x_b, w_b, t_b, c_b)$. The real and simulated challenges and responses are then sent by the prover to the verifier. This forms the third move of the protocol.

The verifier may then verify the simulated and real transcripts that has received from the prover. The verification as indicated in FIG. 5 may consist of checking if the received challenges c0 and c1 are interrelated in accordance with the submitted permutation. In addition, a verification function Verify0 and Verify1 checks the acceptance of the simulated and real transcripts. The functions Verify0 and Verify1 may be known functions of the zero-proof knowledge protocols.

Thus, the proof protocol of FIG. 5 may fulfill the three-move form and completeness conditions. The two remaining conditions may also fulfilled as described with the following theorem.

Theorem 1. The proof given in FIG. 5 is a zero knowledge proof of $x_0 \in L(\Re_0) \lor x_1 \in L(\Re_1)$.

Proof of the Theorem 1

SHVZK: Given $x_0 \in X_0$, $x_1 \in X_1$, and a challenge $\pi \in \Pi$, the simulator 191 samples $c_0 \leftarrow C$ and outputs $Sim_0 (x_0, c_0)$, $Sim_1(x_1, \pi(c_0))$ is uniform in C since $\pi$ is a permutation of C and the distribution is indistinguishable from an honest transcript.

SOUNDNESS: Let P be a deterministic prover that succeeds with probability $p \geq 1/|C| + \varepsilon$, an extractor $\varepsilon$ who runs in expected time $O(poly(B)/\varepsilon)$ (where B is the bit size of the input of the protocol), that can extract $b, t_b, c_b, s_b, c'_b, s'_b$ such that:

$b \in \{0,1\}$ $Verify_b(t_b, c_b, s_b) = 1$ $Verify_b(t_b, c'_b, s'_b) = 1$ $c_b \neq c'_b$ Using this extractor two accepting transcripts may be obtained for $S_b$ with different challenges, and w' such that $(x, w') \in \Re'$ may be obtained.

Extractor $\varepsilon$ first runs prover P on random $\pi \in \Pi$ until it outputs a tuple $(t_0, t_1, \pi, c_0, s_0, c_1, s_1)$ that successfully verifies. This takes expected time $O(1/p)$. Extractor $\varepsilon$ then runs prover P on random $\pi' \in \Pi$ until it outputs a tuple $(t_0, t_1, \pi', c'_0, s'_0, c'_1, s'_1)$ that successfully verifies, such that $c_0 \neq c'_0$ and $c_1 \neq c'_1$. If P succeeds, let b such that $c_b \neq c'_b$, since both transcripts of P are accepting transcripts, the extractor is a desired extractor. The prove that P produces a valid transcript in expected time $O(poly(B)/\varepsilon)$, i.e. that for a fixed $\pi \in \Pi$, his probability of success, over the choice $\pi' \xleftarrow{\$} \Pi$ is greater than $\varepsilon$ may be determined as follows.

Figure 6:
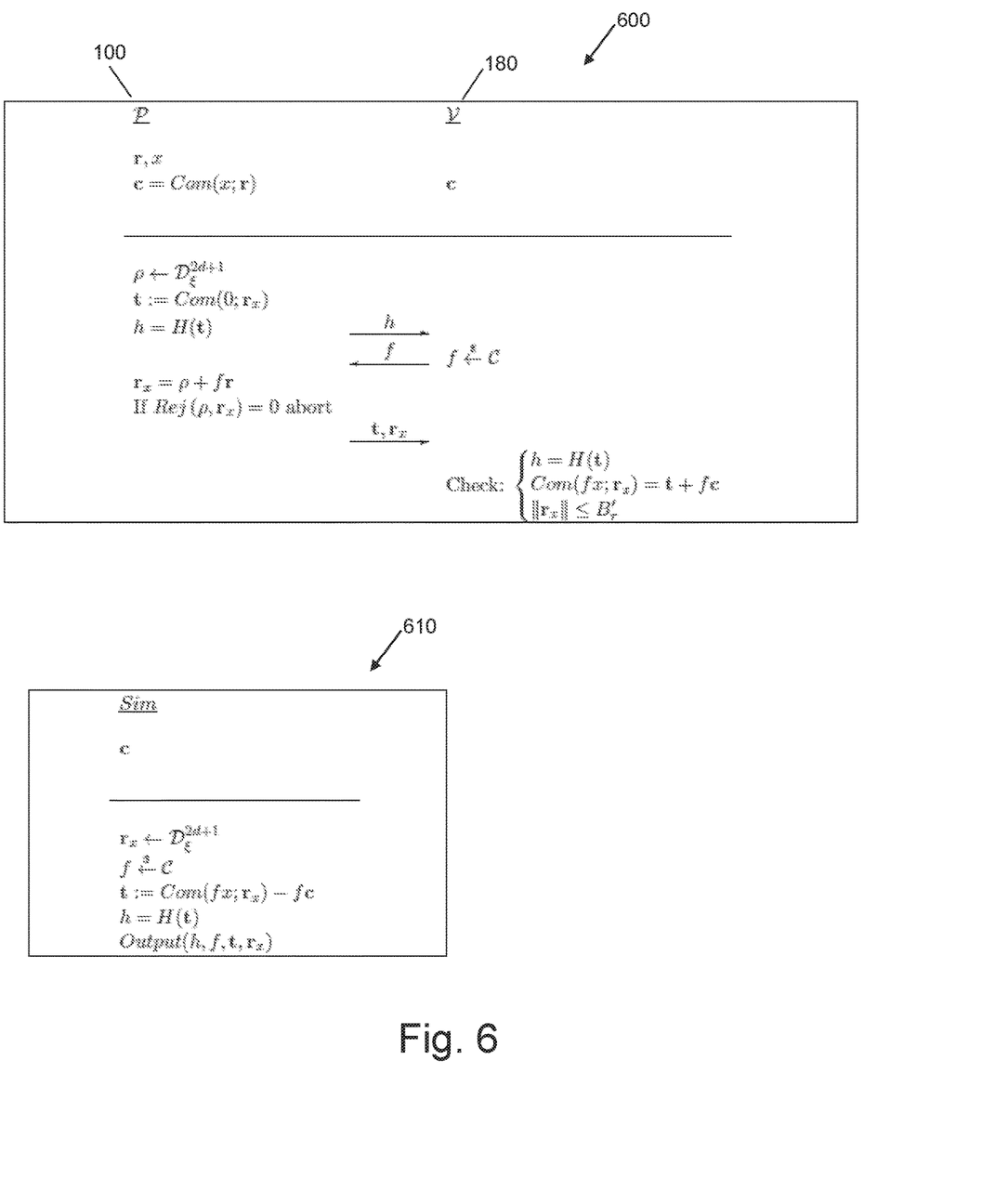
FIG. 6 is a diagram of an example protocol to proof that a homomorphic commitment opens to either 0 or 1 in accordance with present disclosure.

$Pr[\mathcal{P} \text{ succeeds} \land (c_0 \neq c'_0 \lor c_1 \neq c'_1)] =$ $Pr[\mathcal{P} \text{ succeeds}] - Pr[\mathcal{P} \text{ succeeds} \land (c_0 = c'_0 \land c_1 = c'_1)] =$ $1/|C| + \varepsilon - Pr[\mathcal{P} \text{ succeeds} \land (c_0 = c'_0 \land \pi(c_0) = \pi'(c_0)] \geq$ $1/|C| + \varepsilon - Pr[\pi(c_0) = \pi'(c_0)] = \varepsilon$ FIG. 6 depicts a diagram 600 of an example method or protocol to proof that a homomorphic commitment opens to a value x e.g. open to either 0 or 1. In this example, the relation $R_b$ may be defined such that a witness is a homomorphic commitment of corresponding instance. The computations performed by each of the proving unit 100 and the verifier 180 are listed in association with each of the proving unit and verifier as indicated in diagram 600.

Diagram 600 indicates a $\Sigma'$-protocol for proving knowledge of a specific opening to a commitment, which will then be used in the next section ("Proof of opening to 0 or 1") to prove that a commitment opens to either 0 or 1. For a fixed message x, $\Sigma'$-protocol for the language $\Re_x = \{c, r | c = Com(x;r) \land \|r\| \leq B_r\}$ with extractor in $\Re_x' = \{c, (r,f)$ If $c=\text{Com}(f \cdot x; r) \wedge \|r\| \leq B_r' \wedge \|f\| \leq 2B_c\}$. The challenge pace or set is $C = \{f \in \mathbb{Z}[X]/X^n+1 \| \|f\|_\infty = 1, \|f\|^1 = 60\}$.

Theorem 3.

Let $B_r \geq 2\sqrt{n(2d+1)}\sigma$, $B_c = \sqrt{60}$. If $c=\text{Com}(x,r)$ with $\|r\| \leq B_r$ and $x \in \{0,1\}$, $\xi \geq 11 B_c B_r$, and $B_r' \geq 2\xi\sqrt{n(2d+1)}$, then the algorithm in diagram 600 is a zero knowledge proof that c is a valid commitment of either 0 or 1. In diagram 610 of FIG. 6 the simulator used in the proof for soundness is explicitly described. This simulator will be used in the section ("Proof of opening to 0 or 1"). Diagram 600 provides a proof that a commitment opens a value x and diagram 610 indicating the simulator for the proof that the commitment opens to the value x.

Proof of opening to 0 or 1.

The proof that a commitment opens to 0 or 1 is indicated in diagram 620 of FIG. 6. Building blocks may be instantiated as follows:

For $b \in \{0,1\}$, $\mathfrak{R}_b = \{c,r | c=\text{Com}(b;r) \wedge \|r\| \leq B_r\}$ For $b \in \{0,1\}$, $\mathfrak{R}_b' = \{c,(r,f) | f \cdot c=\text{Com}(f \cdot b; r) \wedge \|r\| \leq B_{or} \wedge \|f\| \leq 2B_c\}$ $C = \{f \in \mathbb{Z}[X]/X^n+1 \| \|f\|_\infty = 1, \|f\|_1 = 60\}$ $\Pi = \text{Perm}(n) \times \{0,1\}^{60}$ The challenge set may be the set of elements of with exactly 60 coefficients in $\{-1, 1\}$ and zeroes everywhere else (for n=256, $|C| > 2^{256}$) $\pi = (s,b) \in \Pi$ acts on a polynomial $f \in C$ by permuting its coefficient according to s and changing the sign of the $i^{th}$ nonzero coefficient if $b_i=1$. $\Pi$ verifies the four conditions mentioned above with reference to diagram 620 of FIG. 6. The protocol of FIG. 6 provides a proof that a commitment opens to 0 or 1, i.e. an or-proof that a commitment c is such that $c \in L(\mathfrak{R}_0) \cup L(\mathfrak{R}_1)$.

Theorem 4

Let $B_r \geq 2\sqrt{n(2d+1)}\sigma$, $B_c = \sqrt{60}$. If $c=\text{Com}(x,r)$ with $\|r\| \leq B_r$ and $x \in \{0,1\}$, $\xi \geq 11 B_c B_r$, and $B_{or} \geq 2\xi\sqrt{n(2d+1)}$, then the algorithm in FIG. 6 is a zero knowledge proof that c is a valid commitment of either 0 or 1.

As indicated in diagram 620 of FIG. 6, the simulated commitment $t_{1-x}$ is generated using the homomorphic commitment of corresponding $r_{1-x}$ and a challenge $f_{1-x}$ of the challenge set C and the homomorphic commitment c. And the commitment $t_x$ is generated using the homomorphic commitment of $r_x$.

The two commitments t0 and t1 may be processed by a function H e.g. in order to generate a hash value h that is sent to the verifier. Upon receiving the hash value the verifier may send back to the prover a permutation $\pi$.

The challenge $f_x$ is determined by the prover using the permutation it. The transcripts are then sent to the verifier in order to perform verification in accordance with the check list indicated on the right side of the diagram 600.

The list of checks performed by the verifier upon receiving the transcripts from the prover are indicated in association with the verifier of FIG. 6.

The commitment over polynomials may be described as follows.

The commitment is a lattice-based homomorphic commitment, the security of which relies on the hardness of the M-LWE (Module Learning With Error) and M-SIS (Module Short Integer Solution) problems.

For n a power of two (e.g. 256 or 512), q=poly(n), and $d \in \mathbb{N}$; let $R = \mathbb{Z}[X]/X^n+1$, let $R_q = R/qR$, let $\sigma \in \mathbb{R}$, let $D\sigma$ be the discrete Gaussian distribution of parameter $\sigma$, let $B_c$ and $B_r$ be two positive real bounds. A commitment for elements of $R_q$ may be defined as follows.

Keygen($1^\lambda$):

Let $A' \xleftarrow{\$} \mathcal{R}_q^{d \times (d+1)}$

Let $A = [A' | I_d] \in \mathcal{R}_q^{d \times (2d+1)}$

Let $B \xleftarrow{\$} \mathcal{R}_q^{k \times (2d+1)}$

Output $C := \begin{bmatrix} A \\ B \end{bmatrix} \in \mathcal{R}_q^{(d+1) \times (2d+1)}$ Commit($x \in R_q$):

Let $r \leftarrow \mathcal{D}_\sigma^{2d+1}$

Output $\text{Com}(x; r) := C \cdot r + \begin{bmatrix} 0 \\ x \end{bmatrix} \in \mathcal{R}_q^{d+1}$ Open($c \in R_q^{d+1}, x \in R_q, r \in R_q^{2d+h}, f \in R_q$):

x, r, f is a valid opening of c if $fc = C \cdot r + \begin{bmatrix} 0 \\ fx \end{bmatrix}$ $\|f\| \leq B_c$ $\|r\| \leq B_r$ Theorem 2. The commitment scheme described above is computationally binding and hiding under the M-LWE and M-SIS assumptions.

Proof of Theorem 2. M-LWE may be used as a computational assumption. The scheme is binding if the function which maps $r \in R_q^{2d+1}$ to $A \cdot r \in R_q^{2d}$ is collision resistant for vectors of norm $\|r\| \leq 2B_c$. This may be true if M-SIS$_{q,n,2d+1,2Bc}$ is hard. The scheme is hiding if the function that maps $r \in R_q^{2d+1}$ to $C \cdot r \in R_q^d$ is indistinguishable from uniform for $r \leftarrow D_\sigma^{2d+1}$. This may be true if M-LWE$_{q,n,d,\sigma}$ is hard.

Figure 7:
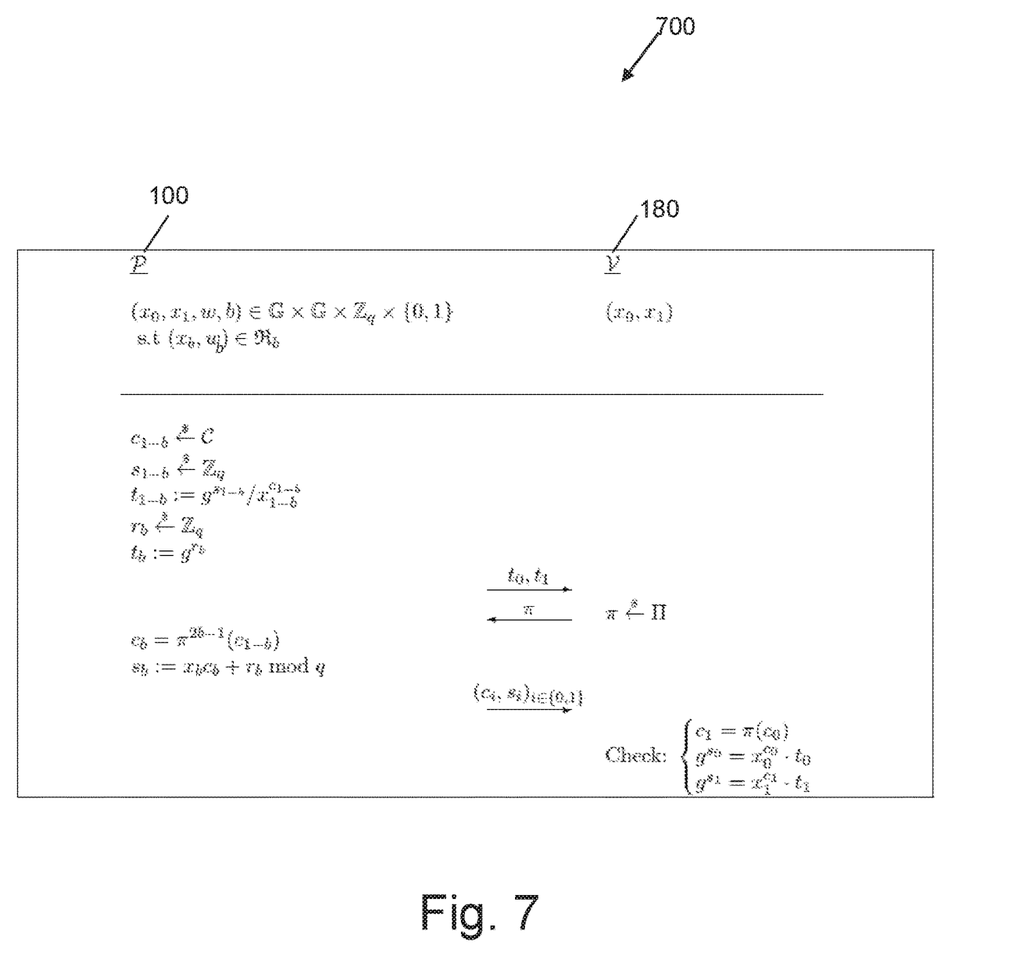
FIG. 7 is a diagram of an example application of the present protocol on Schnorr Proofs.

FIG. 7 is a diagram 700 of an example application of the present protocol on Schnorr Proofs. As an example, the OR-proof construction described herein e g with reference to FIG. 3, may be applied to Schnorr proof of discrete logarithms. The computation of the elements of the simulated and real transcripts are indicated on FIG. 7 (left side)

Let $\mathbb{G}$ be a cyclic multiplicative group of prime order q with generator. Let R and R' be the relations between elements of $\mathbb{G}$ and their discrete logarithm with respect to, i.e., $R = R' = \{(x,w) \in \mathbb{G} \times \mathbb{Z}_q : x = g^w\}$.

If q is a k-bit integer, then let $w_k \ldots w_1$ be the binary representation of $w \in \mathbb{Z}_q$, i.e. $w = \sum_{i=1}^k w_i \cdot 2^{i-1}$. Challenges are taken uniformly from the set C of k-bit integers with exactly $k' \leq k$ one-bits in their binary presentation i.e., $C = \{c \in \{0,1\}^k : \sum_{i=1}^k c_i = k'\}$. For example, when k=256, k' may be equal to 30 so that $$|C| = \binom{256}{30} > 2^{128}.$$

Let $\Pi$ be the set of permutations on the bit positions $\{1, \ldots, k\}$. by having $\pi(c) = c_{\pi(k)} \ldots c_{\pi(1)}$ for $\pi \in \Pi$, where $\Pi$ may be a set of permutations over challenge space C. By applying the present protocol to two instances of Schnorr proof, i.e. $\mathfrak{R}_0 = \mathfrak{R}_1 = \mathfrak{R}$, an OR-proof that $x_0 = g^w \lor x_1 = g^w$ may be obtained as indicated in FIG. 7.

In FIG. 7, c, s, t refer to the challenge, response and commitment respectively. $r_b$ is a predefined value of $\mathbb{Z}$ q that is used to generate the response by the prover.

Various embodiments are specified in the following numbered clauses.

1. A method for performing a disjunctive proof for two relations $R_0$ and $R_1$, the relation $R_0$ being between an instance set $X_0$ and a witness set $W_0$ and defining a language $L(R_0)$ containing those elements $x_0 \in X_0$ for which there exists a witness $w_0$ that is related to $x_0$ in accordance with $R_0$, the relation $R_1$ being between an instance set $X_1$ and a witness set $W_1$ and defining a language $L(R_1)$ containing those elements $x_1 \in X_1$ for which there exists a witness $w_1$ that is related to $x_1$ in accordance with $R_1$, wherein for proving knowledge of a witness $w_b$ of at least one of instances $x_0$ and $x_1$, where b is 0 or 1, of the respective relations $R_0$ and $R_1$ the method comprises:

providing a proving unit comprising a prover and a simulator, wherein the proving unit has an indication of the witness $w_b$ of $x_b$;

generating by the simulator, using the instance $x_{1-b}$, a transcript of a proof of knowledge of an eventual witness of $x_{1-b}$ comprising a simulated commitment, a simulated challenge $c_{1-b}$ from a challenge set $C_{1-b}$, and a simulated response;

generating by the prover a real commitment as the first step in a real proof of knowledge of a witness $w_b$ to $x_b$;

generating by the prover a hash value by applying a hash function to an input comprising the true commitment and the real commitment, and interpreting said hash value as the description a bijective function $\pi$ mapping elements from challenge set $C_0$ to challenge set $C_1$;

computing by the prover a real challenge $c_b$ so that $c_b = \pi^{2b-1}(c_{1-b})$;

creating by the prover a real proof of knowledge using as input a witness $w_b$ of $x_b$ comprising the real commitment, the real challenge $c_b$, and a real response;

sending by the prover the real and simulated proofs of knowledge to the verifier causing the verifier to accept the proofs.

2. The method of clause 1, wherein the proving of the knowledge of a witness of at least one of instances $x_b$ and $x_{1-b}$ is the proving of the following statement $x_0 \in L(R_0)$ OR $x_1 \in L(R_1)$.

3. The method of clause 1 or 2, wherein the simulator is configured to generate for a given $x_k \in L(R_k)$, where k=0 or 1, a transcript that is indistinguishable from a transcript that is generated by the prover from the given $x_k$ and corresponding witness $w_k$.

4. The method of clause 1 or 2 or 3, wherein the relation $R_b$ is defined such that a witness $w_b$ is a homomorphic commitment of corresponding instance $x_b$, wherein polynomials f of the challenge set are defined as $\{f \in \mathbb{Z}[X]/X^n + 1 \| \|f\|_\infty = 1, \|f\|_1 = 60\}$, wherein the predefined bijective function $\pi$ is a permutation that is selected from permutation set $\Pi = \text{Perm}(n) \times \{0,1\}^{60}$, where n is an integer value.

5. The method of clause 1 or 2 or 3, wherein set $X_b$ is a cyclic group $\mathbb{G}$ of prime order q with generator g and the set $W_b$ is group $\mathbb{Z}$ q, wherein witness $w_b$ is related to corresponding instance $x_b$ as follows $x_b = g^{w_b}$.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of providing a secure protocol in a computer network by performing a cryptographic protocol in the computer network, the cryptographic protocol including a disjunctive proof for two relations $R_0$ and $R_1$, the relation $R_0$ being between an instance set $X_0$ and a witness set $W_0$ and defining a language $L(R_0)$ containing those elements $x_0 \in X_0$ for which there exists a witness $w_0$ that is related to $x_0$ in accordance with $R_0$, the relation $R_1$ being between an instance set $X_1$ and a witness set $W_1$ and defining a language $L(R_1)$ containing those elements $x_1 \in X_1$ for which there exists a witness $w_1$ that is related to $x_1$ in accordance with $R_1$, wherein for proving knowledge of a witness $w_b$ of at least one of instances $x_b$ and $x_{1-b}$, where b is 0 or 1, of the respective relations $R_b$ and $R_{1-b}$, wherein the method comprises:

providing a proving unit configured in a hardware device, the proving unit comprising a prover and a simulator, wherein the proving unit has an indication of the witness $w_b$ of $x_b$;

generating by the simulator, using the instance $x_{1-b}$, a transcript of a proof of knowledge of an eventual witness of $x_{1-b}$ comprising a simulated commitment, a simulated challenge $c_{1-b}$ from a challenge set $C_{1-b}$, and a simulated response;

generating by the prover a real commitment as a first step in a real proof of knowledge of a witness $w_b$ to $x_b$;

sending by the prover the real and simulated commitments to a verifier;

in response to the sending of the commitments, receiving by the prover from the verifier a bijective function $\pi$ mapping elements from challenge set $C_0$ to challenge set $C_1$;

computing by the prover a real challenge $c_b$ so that $c_b = \pi^{2b-1}(c_{1-b})$;

creating by the prover a real proof of knowledge using as input a witness $w_b$ of $x_b$ comprising the real commitment, the real challenge $c_b$, and a real response; and sending by the prover the real and simulated proofs of knowledge to the verifier causing the verifier to accept the proofs, wherein a secure two-party protocol for cryptography without having to share a secret is provided in the computer network.

2. The method of claim 1, wherein the challenge sets $C_0$ and $C_1$ are identical, and where the bijective function $\pi$ is a permutation over $C_0 = C_1$.

3. The method of claim 1, wherein the challenge sets $C_0$ and $C_1$ are sets of integers, and where the bijective function $\pi$ is a bijective function of the bit positions in a binary representation of elements of $C_0$.

4. The method of claim 1, wherein the challenge sets $C_0$ and $C_1$ are sets of polynomials, and where the bijective function $\pi$ is a permutation of the coefficients of the polynomials.

5. The method of claim 4, where the challenge sets $C_0$ and $C_1$ are a subset C of $\mathbb{Z}[X]/X^n+1$ for a predefined integer value n.

6. A method of providing a secure protocol in computer network by performing a cryptographic protocol in the computer network, the cryptographic protocol including a disjunctive proof for two relations $R_0$ and $R_1$, the relation $R_0$ being between an instance set $X_0$ and a witness set $W_0$ and defining a language $L(R_0)$ containing those elements $x_0 \in X_0$ for which there exists a witness $w_0$ that is related to $x_0$ in accordance with $R_0$, the relation $R_1$ being between an instance set $X_1$ and a witness set $W_1$ and defining a language $L(R_1)$ containing those elements $x_1 \in X_1$ for which there exists a witness $w_1$ that is related to $x_1$ in accordance with $R_1$, wherein for proving knowledge of a witness $w_b$ of at least one of instances $x_0$ and $x_1$, where b is 0 or 1, of the respective relations $R_0$ and $R_1$ the method comprises:

provide a proving unit configured in a hardware device, the proving unit comprising a prover and a simulator, wherein the proving unit has an indication of the witness $w_b$ of $x_b$;

generating by the simulator, using the instance $x_{1-b}$, a transcript of a proof of knowledge of an eventual witness of $x_{1-b}$ comprising a simulated commitment, a simulated challenge $C_{1-b}$ from a challenge set $C_{1-b}$, and a simulated response;

generating by the prover a real commitment as the first step in a real proof of knowledge of a witness $w_b$ to $x_b$;

generating by the prover a hash value by applying a hash function to an input comprising the true commitment and the real commitment, and interpreting said hash value as the description a bijective function $\pi$ mapping elements from challenge set $C_0$ to challenge set $C_1$;

computing by the prover a real challenge $c_b$ so that $c_b = \pi^{2b-1}(c_{1-b})$;

creating by the prover a real proof of knowledge using as input a witness $w_b$ of $x_b$ comprising the real commitment, the real challenge $c_b$, and a real response; and sending by the prover the real and simulated proofs of knowledge to the verifier causing the verifier to accept the proofs, wherein a secure two-party protocol for cryptography without having to share a secret is provided in the computer network.

7. The method of claim 1, wherein the proving of the knowledge of a witness of at least one of instances $x_b$ and $x_{1-b}$ is the proving of the following statement $x_0 \in L(R_0)$ OR $x_1 \in L(R_1)$.

8. The method of claim 1, wherein the simulator is configured to generate for a given $x_k \in L(R_k)$, where k=0 or 1, a transcript that is indistinguishable from a transcript that is generated by the prover from the given $x_k$ and corresponding witness $w_k$.

9. The method of claim 1, wherein the relation $R_b$ is defined such that a witness $w_b$ is a homomorphic commitment of corresponding instance $x_b$, wherein polynomials f of the challenge set are defined as $\{f \in \mathbb{Z}[X]/X^n+1 \mid \|f\|_\infty = 1, \|f\|_1 = 60\}$, wherein the predefined bijective function $\pi$ is a permutation that is selected from permutation set $\Pi = \text{Perm}(n) \times \{0,1\}^{60}$, where n is an integer value.

10. The method of claim 1, wherein set $X_b$ is a cyclic group $\mathbb{G}$ of prime order q with generator g and the set $W_b$ is group $\mathbb{Z}q$, wherein witness $w_b$ is related to corresponding instance $x_b$ as follows $x_b = g^{w_b}$.

11. A proving unit configured in a hardware device, the proving unit providing a secure protocol in computer network by performing a cryptographic protocol in the computer network, the cryptographic protocol including a disjunctive proof for two relations $R_0$ and $R_1$, the relation $R_0$ being between an instance set $X_0$ and a witness set $W_0$ and defining a language $L(R_0)$ containing those elements $x_0 \in X_0$ for which there exists a witness $w_0$ that is related to $x_0$ in accordance with $R_0$, the relation $R_1$ being between an instance set $X_1$ and a witness set $W_1$ and defining a language $L(R_1)$ containing those elements $x_1 \in X_1$ for which there exists a witness $w_1$ that is related to $x_1$ in accordance with $R_1$, wherein for proving knowledge of a witness of at least one of instances $x_b$ and $x_{1-b}$, b is 0 or 1, of the respective relations $R_b$ and $R_{1-b}$, the proving unit comprising a prover and a simulator, the proving unit having an indication of the witness of $x_b$;

wherein the simulator is configured for generating using the instance $x_{1-b}$, a transcript of a proof of knowledge of an eventual witness of $x_{1-b}$ comprising a simulated commitment, a simulated challenge from a challenge set $C_1$-b, and a simulated response;

wherein the prover is configured for generating a real commitment in a proof of knowledge of a witness $w_b$ for the instance $x_b$;

sending the real and simulated commitments to a verifier;

in response to the sending of the commitments, receiving from the verifier a bijective function $\pi$ mapping elements from challenge set $C_0$ to challenge set $C_1$;

generating a real challenge $c_b$ from challenge set $C_b$ by such that $c_b = \pi^{2b-1}(c_{1-b})$;

creating a real proof of knowledge of the witness of $x_b$ using as inputs the instance $x_b$ and the corresponding witness $w_b$, comprising of the real commitment, the real challenge $c_b$ and a real response; and ending the real and simulated proofs of knowledge causing the verifier to accept the proofs, the proving unit configured to provide a secure protocol in computer network, wherein a secure two-party protocol for cryptography without having to share a secret is provided in the computer network.

12. A proof system comprising the proving unit of claim 11 and a verifier, wherein the verifier is configured for selecting the bijective function from a set of functions and sending the bijective function to the prover in response to receiving the simulated and real commitments from the prover.

13. The method of claim 1, wherein the method secures a lattice-based electronic voting for binary elections for proving that a ballot contains a zero or one vote.

14. The method of claim 6, wherein the method secures a lattice-based electronic voting for binary elections for proving that a ballot contains a zero or one vote.

* * * * *